Figure 1:
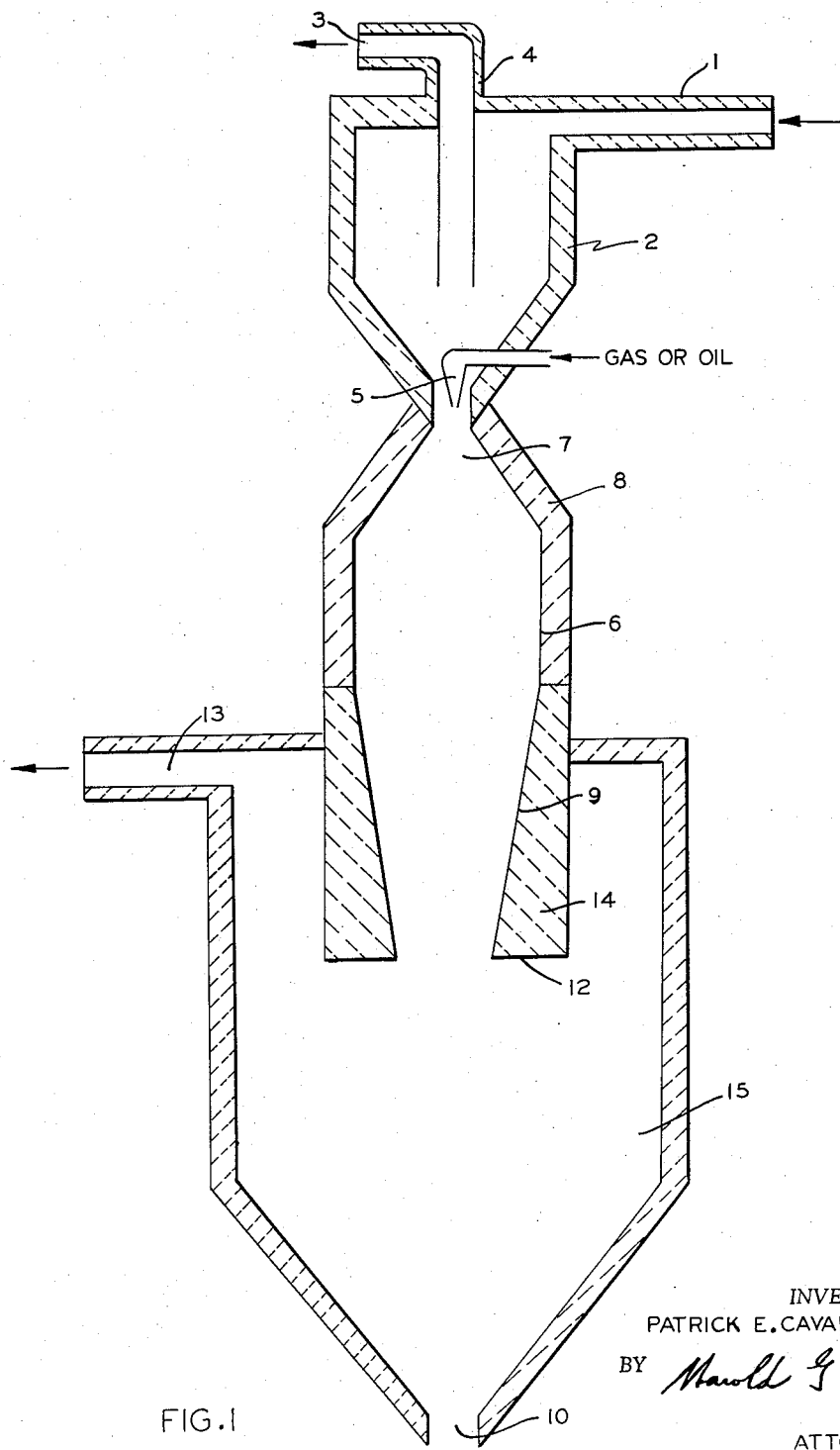

United States Patent Office 2,870,003
Patented Jan. 20, 1959

2,870,003

METHOD OF CONVERTING HEMATITE TO MAGNETITE

Patrick E. Cavanagh, Oakville, Ontario, Canada, assignor to Ontario Research Foundation, Toronto, Ontario, Canada Application June 17, 1957, Serial No. 666,059

6 Claims. (Cl. 75—34)

This invention relates to the concentration of iron ores.

Iron ores may be concentrated for smelting by a variety of known means employing flotation and gravity separation principles.

There are, in addition, many known methods of separating magnetic iron from iron ores, but there is a need for a simple and economical process which will permit non-magnetic hematite iron ores to be reduced to magnetite which may later be separated by magnetic means.

It is another object of this invention to provide such a method as may be embodied in equipment of relatively simple and inexpensive design.

It is a still further object of the invention to provide such a method as will permit the reduction of hematite iron ores to magnetite whereby they may subsequently be concentrated by standard magnetic separation.

These and other advantageous objects will become apparent through a consideration of the following detailed description taken in conjunction with the attached drawing which illustrates schematically in vertical cross-section one means by which the method of the invention may be carried out.

My invention consists broadly in the application of the discovery that, for efficient subsequent magnetic separation it is not necessary to convert the hematite entirely to magnetite, and that a sufficiently full or partial conversion may be accomplished in a relatively short period by feeding finely crushed iron ore into a flame which is adjusted so that the combustion gases are reducing and subsequently either settling the reduced dust out of the combustion gases or removing the reduced dust in the stream of combustion gases, for subsequent magnetic separation.

According to the present invention, the ore to be concentrated is first crushed to less than 150 mesh. This crushed ore is then fed at a controlled rate into a reducing flame. The flame may be provided by natural or manufactured gas, oil or powdered coal. Air is supplied to this flame in insufficient quantity to afford complete combustion so that the percentage of $CO_2$ in the combustion gas is very low and the percentage of CO is high. Under such strong reducing conditions reaction between the combustion gases and the finely crushed ore in the flame is very rapid. I have found that in a strongly reducing gas at a temperature of from 1800 to 2000° F., at least the hematite on the surface of ore particles less than 150 mesh is reduced to magnetite in about one second as follows:

$$3Fe_2O_3 + CO \rightarrow 3Fe_3O_4 + CO_2$$

The difference between strongly reducing and oxidizing flames is easily recognizable by eye to those skilled in the iron smelting and steel making art. According to the method of this invention, the air supplied to the burner is regulated so that the flame has the desired reducing characteristics and a temperature of about 1800–2000° F.

The dust may be recovered from the combustion gases by settling the dust out while passing the gases upwardly and out of the furnace or alternatively the dust may be conveyed out of the furnace in the gas stream. Since at least the surface of the particles in the dust will have been reduced from hematite to magnetite, the dust may subsequently be readily treated in a standard magnetic separator.

The above method is particularly applicable for the concentration of ores wholly or substantially wholly hematite. If the ore contains a substantial amount of magnetite in its natural condition, it will be more efficient to first separate the magnetite from the hematite magnetically and then subject the hematite to the reduction outlined above.

The invention consists in an efficient heating of the crushed ore and its reduction at a temperature of between 1800° and 2000° F. This may best be accomplished simultaneously as outlined above, or, if preferred for any reason, the ore may first be heated in the hottest available flame, and additional reducing gases directed at the flame at the point where the dust has reached the desired temperature to cause the required reduction.

The invention may conveniently be carried out in an apparatus such as that illustrated in Figure 1.

Referring to this drawing, finely crushed hematite ore is introduced in an air stream at 1 into a dust thickener, illustrated in the drawing as at 2. This is a cyclone dust collector, from which is withdrawn, at 3, a controllable amount of air, plus the finely crushed ore. The major portion of the air introduced at 1 (90% or more) will be discharged at the top of the thickener 2 by means of a duct at 4 and will carry with it a portion of the very fine ore dust. A gas or oil burner is provided at 5 which is directed downwardly into the interior of a furnace 6. Fine dust will be fed through the opening surrounding the burner so that it is discharged into the flame below the burner. The burner is regulated so that the air supplied is insufficient to provide full combustion. A reducing flame, directed downwardly, is produced at 7, being so adjusted as to be strongly reducing and to produce an ore temperature of from 1800° to 2000° F.

The upper portion 8 of the furnace 6 is lined with refractory brick while a cooling zone 9 is provided towards the lower extremity. The combustion gases with the reduced dust entrained therein are discharged through outlet 12 at the bottom of the furnace 6, into a larger chamber 15. This will cause a decrease in the velocity of the gases whereupon the solid particles will drop and be discharged via outlet 10 for subsequent magnetic separation, the warm gases rising and being withdrawn through duct 13. The gases may be subjected to further dust collection if desired.

The upper portion 8 of the furnace 6 will be so designed that the ore particles reach a temperature above 1800° F. The bottom portion 9, which may be provided with a water cooling jacket 14, is designed to bring the temperature of the ore particles down below about 900° F.

Figure 2:
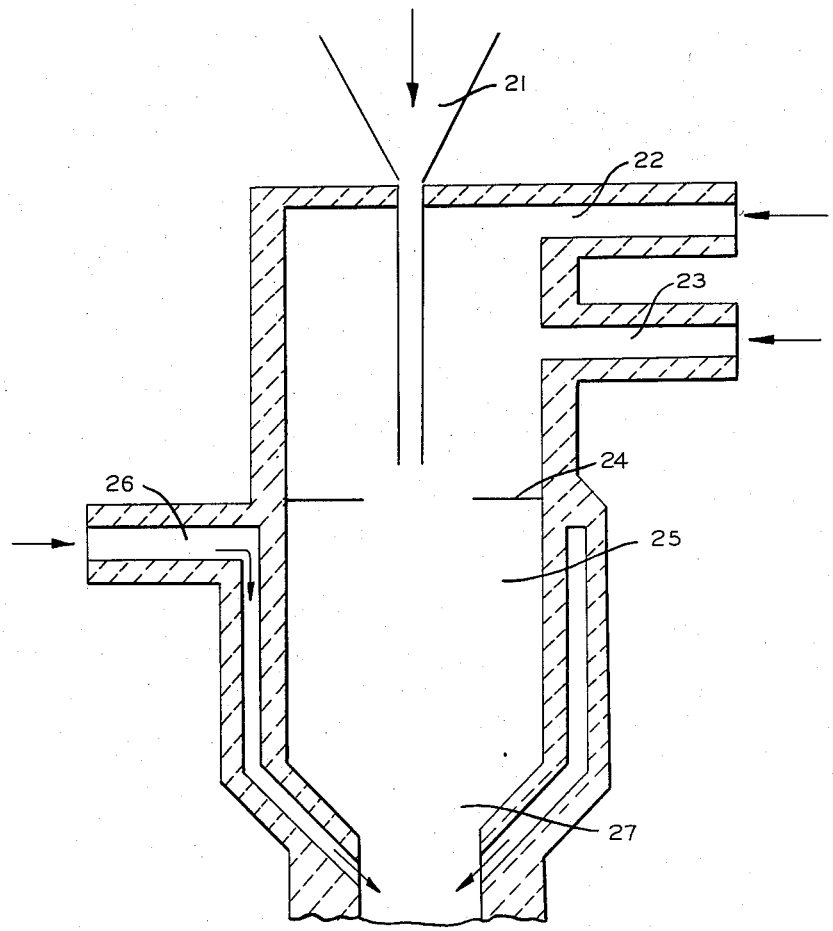

If it is desired to accomplish the reduction as a two stage operation, an apparatus such as that shown in Figure 2 can be employed. In this embodiment, the hematite is charged at 21 and controlled amounts of air and gas added respectively at 22 and 23. An orifice plate 24 will act to provide a hot flame at 25 which, if the proportions of air and gas are properly adjusted will be of the order of 3400° F. Excess gas may then be added as at 26, this gas providing reducing conditions at 27 whereupon the gases, after the ore has been reduced sufficiently, may be cooled and the dust separated as before.

The invention has been described with reference to a specific apparatus designed to carry the invention into practice. It is to be understood, however, that details of the method and constructional features of the apparatus have been given by way only of illustration of the invention and are not to be construed as limiting the invention. Such embodiments of the invention as fall within the scope and purview of the appended claims are to be considered as part of this invention.

What I claim as my invention is:

1. The method of converting hematite at least partially to magnetite which comprises crushing the hematite to at least 150 mesh, feeding the crushed hematite downwardly into a downwardly directed reducing flame concurrently so as to entrain the crushed hematite in the flame, passing the products of combustion with entrained dust into a separating zone, and permitting the solid particles to settle, while removing the gaseous products of combustion separately therefrom.

2. The method of claim 1 wherein said reducing flame is provided by a jet type burner supplied with natural gas.

3. The method of claim 1 wherein said reducing flame is provided by a jet type burner supplied with natural gas, and is adjusted so that the ore particles are heated to between about 1800° F. and about 2000° F.

4. The method of claim 1 wherein said reducing flame is provided by a jet type burner supplied with natural gas, and is adjusted so that the flame temperature is between about 1800° F. and about 2000° F., and the dust is entrained in the flame for about 3 seconds before being separated from the combustion gases.

5. The method of concentrating non-magnetic iron ores through at least partial conversion to magnetite which comprises crushing the ore to less than 150 mesh, feeding the crushed ore downwardly into a downwardly directed reducing flame, concurrently, so as to entrain the crushed ore in the flame, passing the products of combustion with entrained dust into a separating zone, and permitting the solid particles to settle, while removing the gaseous products of combustion separately therefrom.

6. The method of converting hematite at least partially to magnetite which comprises crushing the hematite to at least 150 mesh, feeding the crushed hematite with controlled amounts of air and gas concurrently downwardly into a burner, the proportion of air and gas being such as to provide a flame of about 3400° F. whereby the crushed hematite is entrained in the flame, directing an additional quantity of gas at the flame below the burner to provide reducing conditions therein, sufficient additional gas being so added to produce a reducing flame of the order of 1,800° F. to 2,000° F., and passing the products of combustion with entrained dust into a separating zone, and permitting the solid particles to settle, while removing the gaseous products of combustion separately therefrom.

References Cited in the file of this patent

UNITED STATES PATENTS

| | | |
|---|---|---|
| 1,916,112 | Maier | June 27, 1933 |
| 2,204,576 | Davis | June 18, 1940 |
| 2,418,394 | Brown | Apr. 1, 1947 |
| 2,503,555 | Lykken | Apr. 11, 1950 |
| 2,692,050 | Nelson | Oct. 19, 1954 |